(12) United States Patent
Nagarkar et al.

(10) Patent No.: US 8,735,830 B1
(45) Date of Patent: May 27, 2014

(54) ZINC TELLURIDE SCINTILLATORS

(75) Inventors: Vivek Nagarkar, Weston, MA (US);
Harish B. Bhandari, Brookline, MA (US); Valeriy Gaysinskiy, Allston, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 0 days.

(21) Appl. No.: 13/451,446

(22) Filed: Apr. 19, 2012

Related U.S. Application Data

(60) Provisional application No. 61/477,121, filed on Apr. 19, 2011.

(51) Int. Cl.
*G01T 1/10* (2006.01)
(52) U.S. Cl.
USPC .......................................................... 250/362
(58) Field of Classification Search
USPC ............................................. 250/362, 361 R
See application file for complete search history.

(56) References Cited

U.S. PATENT DOCUMENTS

| 7,700,920 | B2 * | 4/2010 | Nagarkar et al. | 250/361 R |
| 2004/0094721 | A1 * | 5/2004 | Tokuda et al. | 250/370.13 |
| 2007/0054035 | A1 * | 3/2007 | Hosoi et al. | 427/69 |
| 2007/0205371 | A1 * | 9/2007 | Inoue | 250/370.11 |
| 2009/0050810 | A1 * | 2/2009 | Nagarkar et al. | 250/361 R |

FOREIGN PATENT DOCUMENTS

JP     2002022896 A  *  1/2002  ............ G21K 4/00

OTHER PUBLICATIONS

Pattar et al., "Structural optical and electrical properties of vacuum evaporated Indium doped Zinc Telluride thin films," 2009, International Journal of Eletrochmical Science, vol. 4, pp. 369-376.*
Kang et al., "Synthesis and characterization of oxygen doped ZnTe for powder phosphor application." 2005, Journal of Material Research, vol. 20, No. 9, pp. 2510-2515.*

* cited by examiner

*Primary Examiner* — Kiho Kim
(74) *Attorney, Agent, or Firm* — Wilson Sonsini Goodrich & Rosati

(57) ABSTRACT

Zinc telluride scintillators and related devices and methods are provided.

36 Claims, 7 Drawing Sheets

ZINC TELLURIDE SCINTILLATORS

CROSS-REFERENCES TO RELATED APPLICATIONS

The present application claims priority to U.S. Provisional Application 61/477,121, filed Apr. 19, 2011, which is incorporated by reference in its entirety.

BACKGROUND OF THE INVENTION

The present invention relates generally to scintillators, and more specifically to zinc telluride scintillators and related devices and methods.

High resolution imaging applications desire scintillators that have high density, high atomic number, high scintillation efficiency, short emission decay time, low afterglow, good spectral match to a photodetector, and low cost. Powdered oxygen-doped zinc telluride (ZnTe:O) is known to act as a scintillator. However, due to the granular nature of the powdered material, making an efficient scintillator screen of ZnTe:O for high spatial and temporal resolution imaging has evaded researchers and developers. Scintillator screens made from powdered ZnTe:O have only a limited spatial resolution.

Another consideration is problems with adequately doping ZnTe. For example, ion implantation techniques have been used to dope oxygen into ZnTe material. However, the oxygen dopant concentration is not uniform and is higher at the edges, due to insufficient movement of oxygen into the ZnTe material. Laser annealing in an oxygen atmosphere has also been used to dope oxygen into ZnTe material, but this method suffers from a variety of disadvantages including excess oxidation of the material that limits detection properties of the material.

Thus, a need exists for zinc telluride scintillators that have imaging capability with improved properties, such as spatial and/or temporal resolution, and methods of making the zinc telluride scintillators.

BRIEF SUMMARY OF THE INVENTION

The present invention provides zinc telluride scintillators and related devices and methods. The scintillators of the invention are useful in a variety of applications including, for example, spectroscopy detection of energetic photons (X-rays and gamma-rays) and imaging applications (e.g., X-ray imaging, PET, etc.).

In one aspect, the present invention provides a method of making a scintillator comprising zinc telluride and a dopant. The method can include providing an evaporation apparatus comprising an evaporation chamber having a first end portion with a substrate positioned in a holder, and a second end portion with a first source boat separate from a second source boat, and one or more chamber walls at least partially disposed between the first and second end portions; positioning a dopant salt in the first source boat and a zinc telluride (ZnTe) salt in the second source boat; and depositing a scintillator film comprising zinc telluride and a dopant on a surface of the positioned substrate. The present invention also provides doped zinc telluride scintillator films produced by the method provided above.

In another aspect, the present invention provides a method of making a doped zinc telluride scintillator film. The method can include providing a source material including zinc telluride; providing a dopant; evaporating in a chamber the source material with an electron beam; and depositing the source material and the dopant on the surface of a substrate in the chamber, thereby forming a doped zinc telluride scintillator film. The present invention also provides doped zinc telluride scintillator films produced by the method provided above.

In yet another aspect, the present invention provides a method of making a doped zinc telluride scintillator. The method can include providing an evaporation apparatus comprising an evaporation chamber having a first end portion with a substrate positioned in a holder, and a second end portion with a source boat, and one or more chamber walls at least partially disposed between the first and second end portions; positioning a doped zinc telluride material in the source boat; depositing a scintillator material on a surface of the positioned substrate to form the doped zinc telluride scintillator, wherein the film is deposited by a process comprising applying heat to the evaporation chamber so as to vaporize the doped zinc telluride material for film deposition while maintaining a temperature relationship of $T_{wall} > T_{source} > T_{substrate}$ for at least a portion of the deposition process, and $T_{wall}$ comprises a temperature ranging between 700 degrees C. and about 900 degrees C. The present invention also provides doped zinc telluride scintillator films produced by the method provided above.

In yet another aspect, the present invention provides a radiation detection device including any of the doped zinc telluride scintillator films provided herein; and a photodetector assembly optically coupled to the scintillator.

In yet another aspect, the present invention provides a method of performing radiation detection. The method can include providing a detector device comprising any of the doped zinc telluride scintillator films provided herein; and a photodetector assembly optically coupled to the scintillator; and positioning a radiation source within a field of view of the scintillator so as to detect emissions from the radiation source.

For a fuller understanding of the nature and advantages of the present invention, reference should be had to the ensuing detailed description taken in conjunction with the accompanying drawings/figures. The drawings/figures represent embodiments of the present invention by way of illustration. The invention is capable of modification in various respects without departing from the invention. Accordingly, the drawings/figures and description of these embodiments are illustrative in nature, and not restrictive.

DETAILED DESCRIPTION OF THE INVENTION

Figure 1:
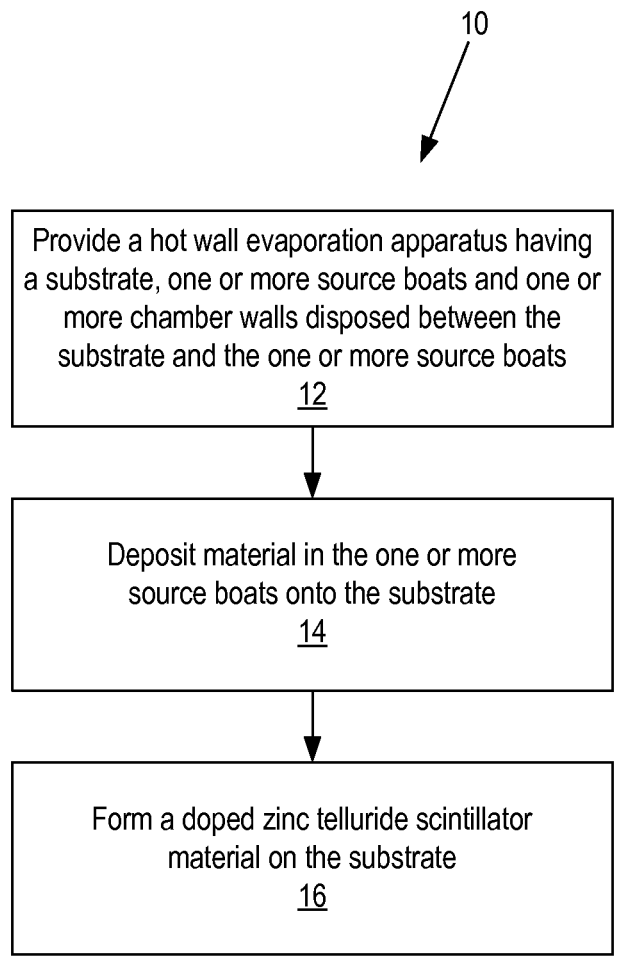
FIG. 1 shows a hot wall evaporation method, according to one embodiment of the present invention.

The present invention relates generally to scintillators, and more specifically to zinc telluride scintillators and related devices and methods. In some embodiments, the present invention includes doped microcolumnar, doped polycrystalline, and/or doped crystalline zinc telluride scintillators. The present invention further provides doped zinc telluride films (e.g., ZnTe:O films).

In some embodiments, the present invention provides a scintillator that includes such a scintillator material (e.g., a scintillator film) including zinc telluride and a dopant. A number of dopants may be used, such as, for example, O, Ag, Eu, Cu, Mn, Cl or Br. A scintillator described herein can include one dopant (e.g., O) or two or more co-dopants (e.g., O and Cu). In one embodiment, the doped microcolumnar zinc telluride scintillators include ZnTe:O scintillator films.

The present invention provides zinc telluride scintillators that can exist in a variety of forms. The scintillators, for example, can be films in microcolumnar, non-columnar polycrystalline, and/or non-columnar crystalline form. The present invention includes a doped polycrystalline zinc telluride scintillator film. In one embodiment, the doped polycrystalline zinc telluride scintillator film is microcolumnar. In one embodiment, the doped polycrystalline zinc telluride scintillator film is non-columnar. In some embodiments, the scintillators can include sandwiched forms of scintillators, also referred to as "phoswich" scintillators. Phoswich scintillators can include scintillator materials having two different scintillator compositions. For example, a ZnTe:O scintillator can be deposited on another scintillator (or vice versa), such as CsI:Tl, thereby allowing, e.g., for dual energy imaging. In some embodiments, the phoswich scintillators can include continuous phoswich scintillators that have, e.g., performance characteristics that vary along the depth (from top to bottom) of the scintillator material (e.g., a $LaCl_3$:Ce scintillator having a varying Ce dopant concentration). For example, concentration of dopant can be higher near the top of the scintillator and then continuously decrease through the thickness of the scintillator. In certain embodiments, a ZnTe:O scintillator can be combined in a phoswich structure with one or more other scintillators (e.g., by growing one atop another and/or by physical assembly) that have and/or do not have continuous phoswich capability.

The present invention additionally includes methods and structures for fabricating the described zinc telluride scintillators. The zinc telluride scintillators (e.g., doped zinc telluride scintillators) can be made according to a number of different fabrication techniques. In some embodiments, scintillators can be produced as transparent or translucent scintillators that include a crystalline or polycrystalline epitaxial layer(s). A polycrystalline columnar form can be produced with stoichiometry appropriate for producing efficient scintillation. The scintillators described herein can be produced in a variety of thicknesses and spatial areas. In some embodiments, scintillators can be produced as a film, e.g., films having a thickness ranging from about 50 microns to 500 microns. In certain embodiments, the scintillators can have a thickness of less than about one micron, or greater than about 1 mm. The scintillators described herein can be freestanding films, e.g., where the deposited film can be removed from the substrate after deposition. In certain embodiments, the scintillators can have a thickness of 1 cm or greater, and can be referred to as "slabs."

In some embodiments, zinc telluride scintillators can be grown using a vapor deposition technique, co-evaporation in a hot wall evaporation (HWE) apparatus (which can embody the process of hot wall epitaxy). Hot wall evaporation techniques, as described herein, include a vacuum deposition technique where scintillator film is efficiently deposited on a surface of a substrate. FIG. 1 provides an example method 10 for performing hot wall evaporation to make a doped zinc telluride scintillator. In general, the method can include providing a hot wall evaporation apparatus having a substrate, one or more source boats and one or more chamber walls disposed between the substrate and the one or more source boats 12. Material in the one or more source boats can be deposited onto the substrate 14, and a scintillator material (e.g., a doped zinc scintillator material) can be formed on the substrate 16.

Figure 2:
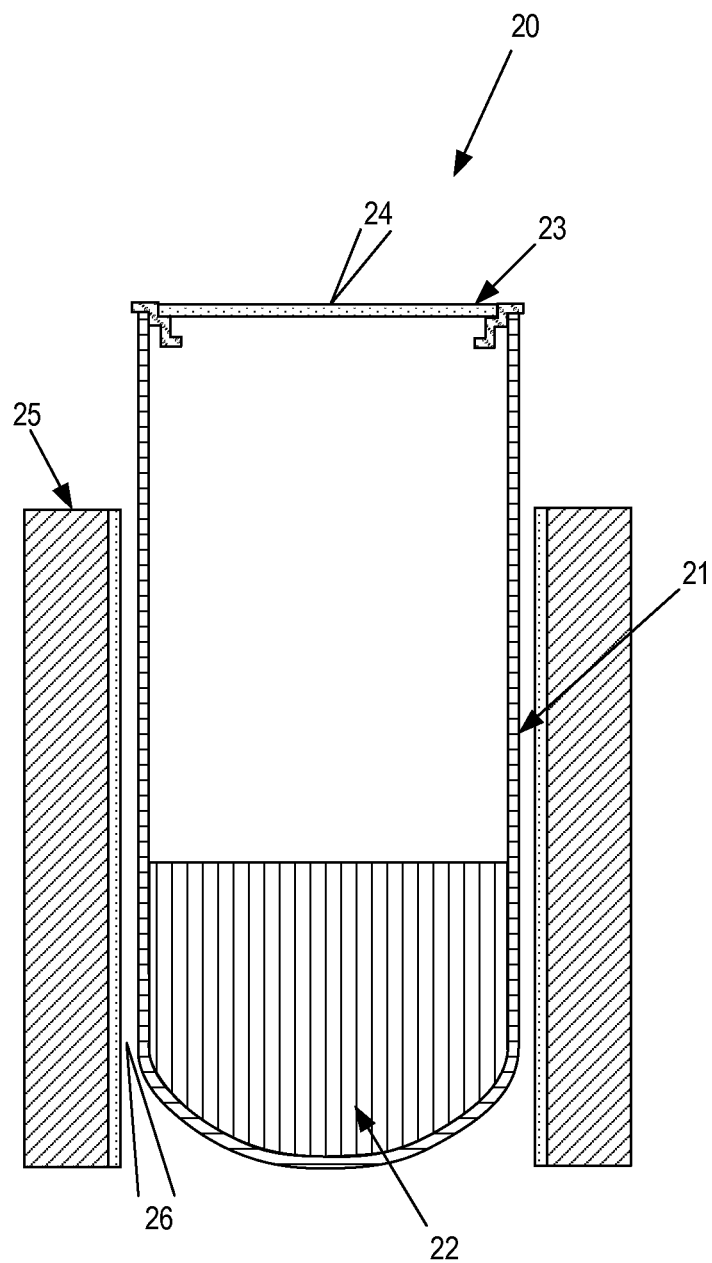
FIG. 2 shows a hot wall evaporation apparatus, according to one embodiment of the present invention.

FIG. 2 shows an example hot wall evaporation apparatus 20 for use in the present invention. In the simplest form the HWE apparatus includes a chamber or cylinder (e.g., a quartz crucible) 21 positioned in a vacuum, heated, with an evaporation source "boat" or reservoir holding a source material 22 at one end (typically the bottom in an upright positioned chamber) and a temperature controlled substrate 23 at the other (typically the top in an upright positioned chamber). The temperature of the substrate 23 can be controlled with a thermocouple 24, such that, e.g., the substrate has a temperature between about 200° C. and about 600° C. The chamber or cylinder can be heated by chamber walls including a heater 25 that can include a thermocouple 26 configured to heat the chamber or cylinder at temperatures, e.g., between about 700 to about 1000° C.

In certain embodiments, the disclosed methods makes use of salts, such as ZnTe and ZnO, and vapor deposits them, e.g., simultaneously, on a suitable substrate using two independent sources. Under different deposition conditions, the material grows in the desired form. In one embodiment, two source boats are used to accomplish co-evaporation of a zinc telluride salt and a dopant salt, e.g., ZnO salt, for deposition of a scintillator film on a substrate surface. In some embodiments, the HWE techniques can include three or more source boats. Each boat can contain a particular source material or charge of interest to produce the scintillators described herein. The source boats can be positioned separate (e.g., laterally spaced) from each other. One source boat can also be used. For example, doped ZnTe source material (e.g., ZnTe powder ball-milled in the presence of one or more other substances, such as a gas, to introduce dopant(s)) can be added to one source boat and vaporized in the hot wall evaporation apparatus for deposition on the substrate.

For HWE, the heated cylinder wall serves to enclose, deflect and effectively direct the vapor from the source to the substrate where molecules are deposited with a shallow impinging angle. With the substrate being the coolest part in the system (e.g., compared to the cylinder wall and source material), molecules adhere solely or primarily to the substrate and do not substantially accumulate on the hot walls, making efficient use of the source material. To ensure thermodynamic equilibrium the relationship between the substrate temperature and that of the source and the heated wall should be: $T_{wall} > T_{source} > T_{substrate}$. After deposition, the deposited scintillator material can be annealed in a variety of atmospheric conditions (e.g., in a zinc-containing atmosphere). Annealing can be used to enhance the performance of the scintillators described herein. In addition, gas that includes dopants (e.g., oxygen, Cl, and/or Br) can be provided (e.g., bleeding into the chamber) during deposition to introduce dopant into the zinc telluride films.

In some embodiments, an applied temperature gradient can include applied temperatures ranging from about 700 degrees C. to about 900 degrees C. during deposition. For example, $T_{wall}$ in the hot wall evaporation chamber can be at a temperature ranging between about 700 degrees C. and about 900 degrees C. The methods of making can also include using a substrate having a temperature between about 350 degrees C. and about 500 degrees C. during deposition.

An advantage of HWE is that it preserves the composition of the grown film with reference to the evaporants even though they have relatively large differences in vapor pressures and sticking coefficients. This is due to the fact that HWE takes place under conditions of thermodynamic equilibrium, which allows the high vapor pressures of various compounds to be maintained. As a result, the dissociation of various constituents does not present a problem for film growth. As a matter of fact, the interaction of components with each other on the substrate surface can lead, under favorable growth conditions, to the formation and growth of the well-structured films. Thus, HWE is particularly advantageous for depositing doped ZnTe films using two sources, where ZnTe and dopant ZnO differ by orders of magnitude in their vapor pressure. HWE preserves the stoichiometry in the deposited ZnTe:O.

Deposition of microcolumnar films requires that the evaporated material be incident on the substrate at a grazing angle. HWE creates this condition through minimized mean free path for the vaporized molecules due to the large density of evaporated material, and through efficient reflection of molecules from walls, which are maintained at the highest temperature in the setup. Thus, the thermodynamic equilibrium and atmosphere conducive to growth created by the HWE process allows deposition of stoichiometrically balanced films with well-separated columnar morphology.

Another aspect of HWE is its high (close to 100%) deposition efficiency, as the substrate is the coldest part of the evaporation environment. As a result, vapors that impinge on HWE system parts, including the hot walls, are deflected and mostly condense only on the relatively cool substrate. Consequently, material loss is at a minimum, enhancing the deposition efficiency to 95% or more (and greatly simplifying apparatus cleaning and maintenance).

A feature of HWE for thick film deposition is that the growth rate is an order of magnitude higher than that of conventional physical vapor deposition (PVD) systems. For a single evaporant material system the deposition rate is proportional to the impingement rate (Ø) of atoms on the substrate at constant temperature, and is governed by the equation (1):

$$\text{Ø} = n(kT/2\Pi m)^{1/2} \quad (1)$$

where n is the number of evaporant molecules per unit volume, k is the Boltzmann constant, T is the source temperature, and m is the mass of the molecule. For hot wall evaporation of ZnTe:O, a two-evaporant system, this equation still holds, since the vapor phases of the constituent compounds are in equilibrium with the source materials. Therefore, the two evaporant deposition process is basically very similar to that for a single evaporant material. As the source temperature T is very high and the substrate is the coldest part in the evaporator, the impingement rate of molecules and, hence, the film growth rate is an order of magnitude higher than with conventional systems. The growth rate is related to the impingement rate by the following equation (2):

$$\text{Growth rate} = \{\text{Ø}^* \text{Average thickness of ZnTe:O monolayer}\}/\{\text{Surface density of ZnTe:O}\} \quad (2)$$

The process of material growth can consist of a series of events that begin with the physical adsorption of a fraction of the incident molecules on the substrate or by forming a stable nucleus by interaction with the other adsorbed molecules. This process of nucleation and growth is typical for the formation of a film of one material on a substrate of a different material. In HWE, no nucleation takes place, but growth occurs by direct adsorption of the molecules on low energy sites, such as kinks on an atomic ledge on the substrate. Under these conditions, even when the growth rate is very high, a monolayer-by-monolayer deposition is obtained resulting in excellent stoichiometry of the films.

The present invention further includes methods of making doped zinc telluride scintillators (e.g., doped microcolumnar zinc telluride scintillators) by electron beam ("e-beam") evaporation methods. Electron beam evaporation techniques provide a number of advantages including, for example, higher localized heating (e.g., 1500-2500 degree C.) for efficient evaporation of materials having high melting points. In addition, electron beam evaporation allows for run-to-run repeatability, and substrate temperatures can be kept at low temperatures (e.g., 25 to 300 degrees C.).

Figure 3:
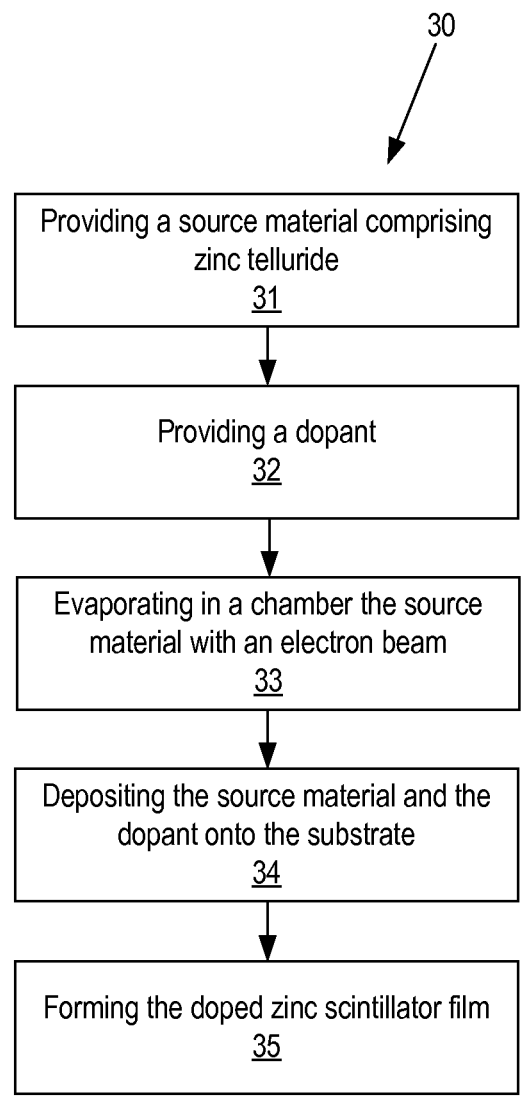
FIG. 3 provides an electron beam evaporation method, according to one embodiment of the present invention.

FIG. 3 describes an example method of making a doped zinc telluride scintillator using an electron beam 30. The method 30 includes providing a source material comprising zinc telluride (Step 31), providing a dopant (Step 32), evaporating in a chamber the source material with an electron beam (Step 33), depositing the source material and the dopant on the surface of a substrate in the chamber (Step 34), thereby forming a doped zinc telluride scintillator film (Step 35).

Dopants can be provided for the e-beam methods in a variety of ways. For example, the method can include evaporating a zinc telluride source material with an electron beam, depositing the zinc telluride source material on a surface of a substrate, evaporating a dopant source material with an electron beam, depositing the dopant source material on the surface of the substrate, and annealing the deposited zinc telluride source material and dopant source material to form the doped zinc telluride scintillator. The dopant source material can be evaporated by an e-beam to be deposited in a layer either on or below a deposited zinc telluride source material such that the layers can later be annealed together to form a doped zinc telluride scintillator film. The alternating layered structures of zinc telluride source material and dopant source material can include tens, hundreds, or thousands or more layers to form the scintillator film. For example, a scintillator film can include alternating layers of zinc telluride that are about 500 nm in thickness sandwiched with layers of zinc oxide that are about 10 nm in thickness. Thicknesses of the layers can be tailored for a desired dopant concentration (e.g., 2% oxygen doping). In addition, the number of layers in the film can be selected to provide a given thickness for a particular application (e.g., 500 microns for digital radiography). In some embodiments, a dopant or multiple dopants in gaseous form can be introduced into a scintillator of the present invention. For example, a gas (e.g., ozone ($O_3$), Cl, or Br) could be introduced (e.g., by bleeding) into the e-beam chamber before or while evaporating ZnTe. In some embodiments, a variety of methods for obtaining monatomic gases can be used, such as breaking $O_2$ into O+O. In some embodiments, a source material including zinc telluride and a dopant can be provided together in the form of a doped zinc telluride source material (e.g., ZnTe:O powder) and evaporated with an e-beam to be deposited as a scintillator film.

Figure 4:
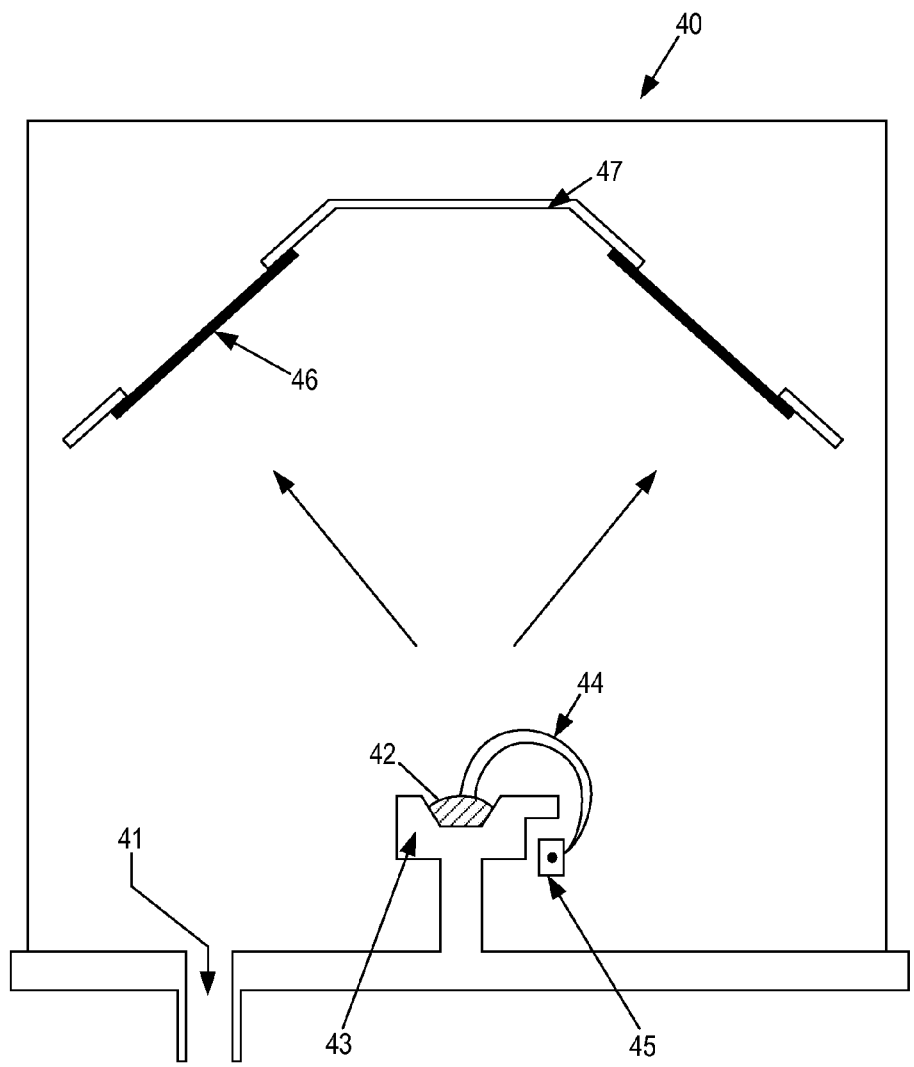
FIG. 4 depicts an electron beam evaporation apparatus, according to one embodiment of the present invention.

The present invention further includes a variety of electron beam apparatus for making the scintillators. FIG. 4 depicts an example electron beam apparatus 40. As shown, the e-beam apparatus 40 can be pumped down using a vacuum pump 41, and a material to be evaporated (e.g., ZnTe source material and/or dopant) 42 can be placed in a crucible (e.g., a water cooled crucible) 43. An e-beam 44 generator (e.g., a thermionic filament 45) can be used to evaporate the material 42 to deposit the material on a substrate (e.g., a wafer) 46 that is, e.g., coupled to a wafer carousel 47. It will be generally understood by those of ordinary skill in the art that a variety of e-beam apparatus systems can be used. Also, a variety of methods can be used to evaporate the source material. In one embodiment, an electron beam can be scanned over the source material. Alternatively, the source material can be moved in relation to the electron beam. Multiple e-beam sources can also be used. For example, one e-beam source can be used to evaporate a ZnTe source material and a second e-beam source can be used to evaporate a dopant source material (e.g., ZnO).

In one embodiment, deposition of many alternating layers of ZnTe and ZnO can be performed using an apparatus including one or more crucibles (e.g., four crucibles) in an electron beam evaporator for accurate control of dopant concentration in the deposited film. The apparatus can further include a carousel. The films can be annealed after deposition for uniform dopant distribution throughout the thickness of the film. In some embodiments, by controlling the evaporation time and power applied to the electron beam for each material, it is possible to deposit a sandwiched scintillator (in certain cases termed a phoswich scintillator) where a stepped or effectively continuous concentration gradient of one material (e.g., ZnTe) with respect to the other is achieved (e.g., ZnO). ZnTe:O deposited using electron beam evaporation can be protected by performing a post-deposition coat of alumina, silica or titania using the same e-beam setup, during the same run, without breaking the vacuum. This coat can act as a barrier to moisture and air.

Electron beam deposition methods can be used to make a variety of doped zinc telluride scintillator (e.g., ZnTe:O) forms. For example, the present invention includes making microcolumnar scintillators using e-beam evaporation. For microcolumnar scintillators, the substrate can have a temperature of less than about 100° C. Polycrystalline scintillators can also be produced using a substrate temperature between about 200° C. to about 300° C. The microcolumnar and polycrystalline scintillator films can, e.g., range in thickness from about 50 microns to about 500 microns. In some embodiments, a substrate can be positioned ~10 inches or more away from the source material being evaporated. To facilitate deposition of microcolumnar scintillator films, the substrate can also be arranged at an oblique angle with respect to an axis of the e-beam apparatus. For instance, as shown in FIG. 4, the wafer 46 is at an angle with respect to the axis of the apparatus, which is normal to the surface of the source material 42. In certain embodiments, the orientation of the substrate surface can be characterized by an angle ranging from about 30-80 degrees with respect to the axis of the e-beam apparatus. For an angle of about 80 degrees, the substrate will be oriented nearly parallel to the bottom surface of the apparatus. In addition, as shown in FIG. 4, for example, one or more substrates (or wafers) can be arranged in a planetary system, such that the substrates can be rotated around the axis of the apparatus as well as axes normal to the surface of the substrates.

A variety of other methods can be used for fabrication. For example, physical vapor deposition (e.g., thermal vapor deposition) can be used to evaporate materials and then condense them on a substrate. Physical vapor deposition by way of sputtering can also be used for depositing material on a substrate. Similar to the e-beam methods described above, the present invention includes a thermal vapor deposition method including evaporating a zinc telluride source material with an thermal vapor deposition apparatus, depositing the zinc telluride source material on a surface of a substrate, evaporating a dopant source material with an thermal vapor deposition apparatus, depositing the dopant source material on the surface of the substrate, and annealing the deposited zinc telluride source material and dopant source material to form the doped zinc telluride scintillator. The alternating layered structures of zinc telluride source material and dopant source material can include tens, hundreds, or thousands or more layers to form the scintillator film. For example, a scintillator film can include alternating layers of zinc telluride that are about 500 nm in thickness sandwiched with layers of zinc oxide that are about 10 nm in thickness. Thicknesses of the layers can be tailored for a desired dopant concentration (e.g., 2% oxygen doping). In addition, the number of layers in the film can be selected to provide a given thickness for a particular application (e.g., 500 microns for digital radiography). Mixing-based techniques can also be used. For example, slurry method printing includes mixing powdered scintillator with a binder and then coating the slurry on a substrate (e.g., a flexible substrate). Similarly, the slurry of mixed powdered scintillator and a binder can be screen printed onto on a substrate (e.g., a flexible substrate). Gravitational settling can also be used, in which a powdered scintillator and a binder are mixed with a volatile solution. The mixture can be poured on a flat surface (e.g., a substrate) allowing the volatile solution to evaporate and leaving a scintillator film on the surface. In some embodiments, chemical vapor deposition can be used.

In certain embodiments, the methods of the invention can be used to make scintillators capable of dual energy imaging. For example, the zinc telluride scintillators can be combined with other scintillator materials, e.g., structured scintillators. In one embodiment, a zinc telluride scintillator described herein can be coated on a microcolumnar CsI:Tl scintillator. One of the scintillators can be used to detect one energy of radiation (e.g., X-rays), while the other scintillator can be used to detect another energy of radiation (e.g., gamma rays).

As set forth above, scintillator compositions of the present invention may find use in a wide variety of applications. In one embodiment, for example, the invention is directed to a method for detecting energy radiation (e.g., gamma-rays, X-rays, neutron emissions, alpha particles, beta particles and the like) with a scintillation detector including a scintillator described herein. In certain embodiments, the microcolumnar form of ZnTe scintillators described herein can be used for high resolution imaging. In some embodiments, the doped ZnTe scintillators described herein (e.g., ZnTe:O) can be used for digital radiography.

Figure 5:
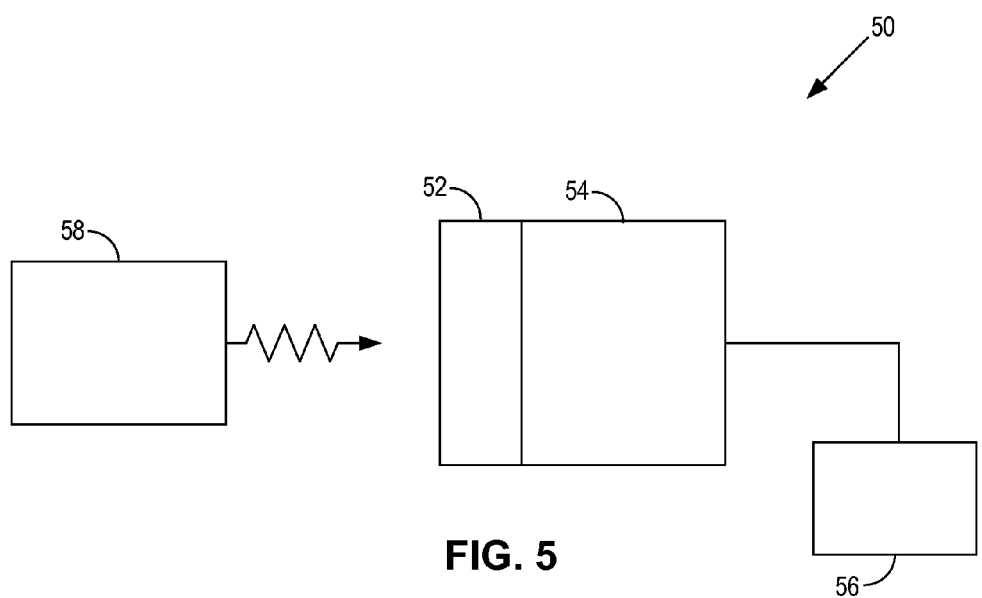
FIG. 5 illustrates an exemplary detection device, according to one embodiment of the present invention.

FIG. 5 is a diagram of a detector assembly or radiation detector of the present invention. The detector 50 includes a scintillator 52 operably coupled to a light photodetector 54 or imaging device. The detector assembly 50 can include a data analysis, or computer, system 56 to process information from the scintillator 52 and light photodetector 54. In use, the detector 50 detects energetic radiation emitted form a source 58.

A data analysis, or computer, system thereof can include, for example, a module or system to process information (e.g., radiation detection information) from the detector/photodetectors in an invention assembly and can include, for example, a wide variety of proprietary or commercially available computers, electronics, or systems having one or more processing structures, a personal computer, mainframe, or the like, with such systems often comprising data processing hardware and/or software configured to implement any one (or combination of) the method steps described herein. Any software will typically comprise machine readable code of programming instructions embodied in tangible media such as a memory, a digital or optical recording medium, optical, electrical, or wireless telemetry signals, or the like, and one or more of these structures may also be used to transmit data and information between components of the system in any of a wide variety of distributed or centralized signal processing architectures.

The detector assembly typically includes material formed from the scintillator compositions described herein (e.g., a doped microcolumnar zinc telluride scintillator). The detector further can include, for example, a light detection assembly including one or more photodetectors. Non-limiting examples of photodetectors include photomultiplier tubes (PMT), photodiodes, PIN detectors, charge coupled device (CCD) sensors, image intensifiers, avalanche detectors and the like. Choice of a particular photodetector will depend in part on the type of radiation detector being fabricated and on its intended use of the device. In certain embodiments, the photodetector may be position-sensitive. Detectors can further include imaging devices that can acquire images at high frame rates, such as frame rates that are faster than about 30 frames per second, about 100 frames per second, or about 1000 frames per second.

The detector assemblies themselves, which can include the scintillator and the photodetector assembly, can be connected to a variety of tools and devices, as mentioned previously. Non-limiting examples include nuclear weapons monitoring and detection devices, well-logging tools, and imaging devices, such as nuclear medicine devices (e.g., PET). Various technologies for operably coupling or integrating a radiation detector assembly containing a scintillator to a detection device can be utilized in the present invention, including various known techniques. In certain embodiments, the radiation detector comprises a doped zinc telluride scintillator formed on a substrate that is optically coupled to the photodetector. Similarly, scintillator screens including a doped zinc telluride scintillator can be included in a radiation detector such that the screen is optically coupled to the photodetector.

The detectors may also be connected to a visualization interface, imaging equipment, or digital imaging equipment (e.g., pixilated flat panel devices). In some embodiments, the scintillator may serve as a component of a screen scintillator. Energetic radiation, e.g., X-rays, gamma-rays, neutron, originating from a source, would interact with the scintillator and be converted into light photons, which are visualized in the developed film. The film can be replaced by amorphous silicon position-sensitive photodetectors or other position-sensitive detectors, such as avalanche diodes and the like.

The methods of the present invention further include methods of performing radiation detection. The methods of performing radiation detection can include providing a detection device (e.g., a detector) comprising a scintillator including a doped zinc telluride scintillator film; and a photodetector assembly operably coupled to the scintillator; and positioning the device such that a radiation source is within a field of view of the scintillator so as to detect emissions from the source. Emissions from the source can include x-rays, gamma-rays, neutrons, alpha particles, beta particles, or a combination thereof. In certain embodiments, a patient can be positioned between the radiation source and the scintillator. In some embodiments, the radiation source includes a patient. In some embodiments, the detector can be positioned such that the radiation source is in the field of view of the scintillator. Alternatively, the radiation source can be positioned in the field of view of the scintillator contained in the detector. Also, both the radiation source and the detector can be moved at the same time such that the radiation source is in the field of view of the scintillator.

Imaging devices, including medical imaging equipment, such as the PET and SPECT devices, and the like, represent other potential applications for the invention scintillator compositions and radiation detectors. Furthermore, geological exploration devices, such as well-logging devices, were mentioned previously and represent an important application for these radiation detectors. The assembly containing the scintillator usually includes, for example, an optical window at one end of the enclosure-casing. The window permits radiation-induced scintillation light to pass out of the scintillator assembly for measurement by the photon detection assembly or light-sensing device (e.g., photomultiplier tube, etc.), which is coupled to the scintillator assembly. The light-sensing device converts the light photons emitted from the scintillator into electrical pulses that may be shaped and digitized, for example, by the associated electronics. By this general process, gamma-rays can be detected, which in turn provides an analysis of geological formations, such as rock strata surrounding the drilling bore holes.

In many of the applications of a scintillator composition as set forth above (e.g., nuclear weapons monitoring and detection, imaging, and well-logging and PET technologies), certain characteristics of the scintillator are desirable, including high light output, fast rise time and short decay time, good timing and spatial resolution, and suitable physical properties. The present invention is expected to provide scintillator materials which can provide the desired high light output and initial photon intensity characteristics for demanding applications of the technologies. Furthermore, the scintillator materials are also expected to be produced efficiently and economically, and also expected to be employed in a variety of other devices which require radiation/signal detection (e.g., gamma-ray, X-ray, neutron emissions, and the like). In addition, the vapor deposition methods described herein (e.g., hot wall evaporation and e-beam evaporation) allow for coating of the scintillator films on a variety of substrate shapes as well as types. For example, the scintillator films can be coated on lenses or other cover surfaces, and over large areas as well, thereby providing additional advantages.

The following examples are provided to illustrate but not limit the invention.

EXAMPLES

Example 1

Fabrication of Columnar ZnTe:O Films Using ZnTe and ZnO

The microcolumnar films of ZnTe:O were fabricated using the hot wall evaporation (HWE) technique. HWE is a vacuum deposition technique whose main characteristic is the growth of material under conditions of thermodynamic equilibrium and with a minimum loss of material. The HWE apparatus consists of a hollow cylinder positioned upright in a vacuum, heated, with an evaporation source "boat" at one end (typically the bottom) and a cooled substrate at the other (typically the top). For this example, two collocated boats were used to accomplish coevaporation of ZnTe and ZnO. The heated cylinder wall serves to enclose, deflect and effectively direct the vapor from the sources to the substrate, where molecules are deposited with a shallow impinging angle. With the substrate being the coolest part in the system, molecules adhere to the substrate alone and do not accumulate on the hot walls, making efficient use of the source material. To ensure thermodynamic equilibrium, the HWE technique requires that the substrate temperature is the lowest and the wall temperature the highest amongst the substrate, source, and wall.

While several substrates such as quartz, alumina, and graphite were used for the initial experiments, results were seen using round quartz substrates with thickness of 1 mm and diameter of 68 mm. This size was chosen based on the geometry and size of the quartz crucibles used for the HWE. Experiments were carried out using quartz substrates that were polished on both sides as well as those that were polished on one side and frosted on the other. While occasional delamination was observed on the double-side polished substrates, no such problem was encountered on ZnTe:O films deposited on the frosted quartz substrates. Films ranging in thickness from 50 microns to 500 microns were successfully fabricated using the HWE technique. Vapor deposition methods can be used to produce either polycrystalline non-columnar or polycrystalline microcolumnar films of ZnTe:O, depending upon process parameters such as source and substrate temperatures.

Example 2

Spectral and Imaging Characterization of a ZnTe:O Scintillator Film

Figure 6:
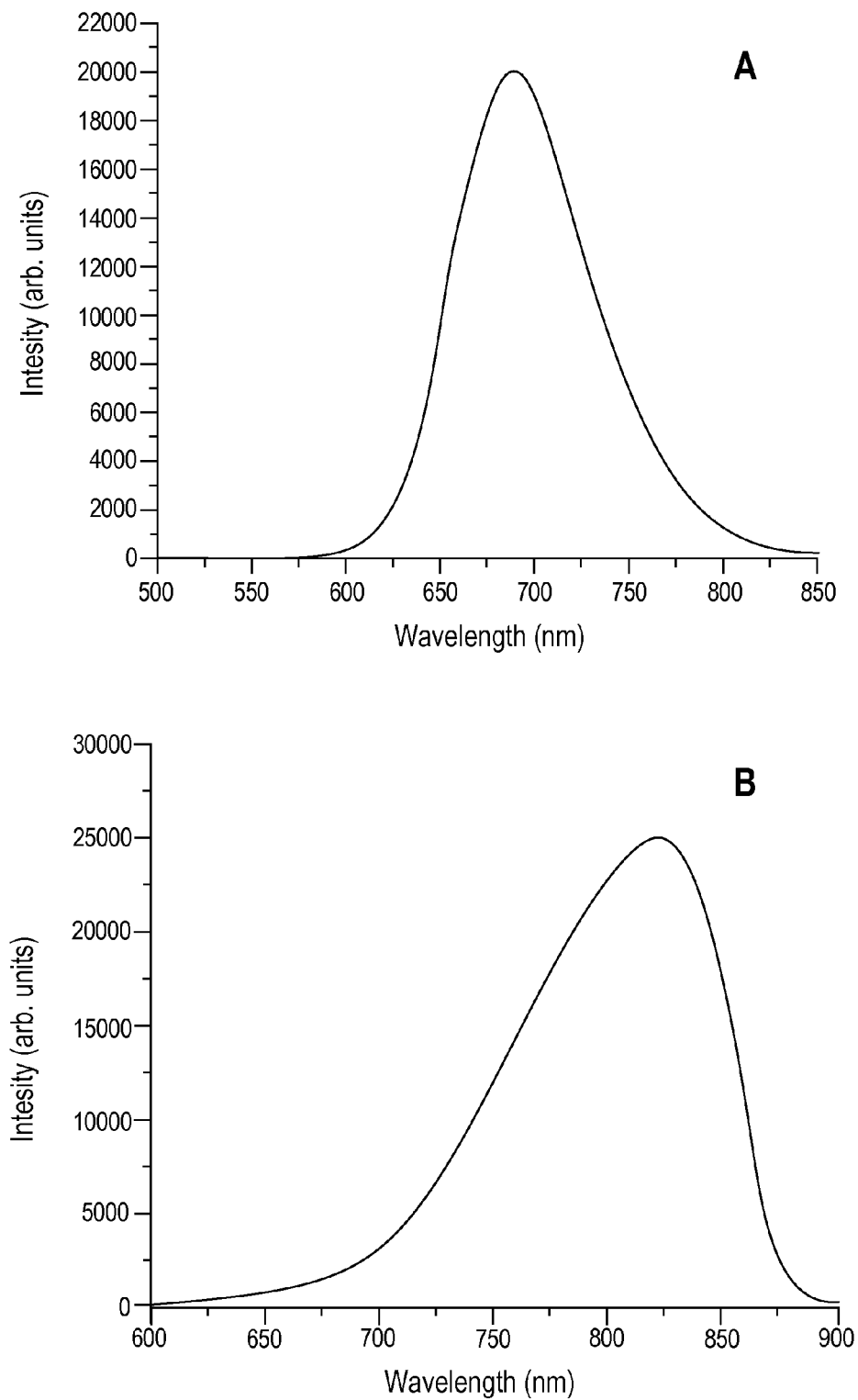
FIG. 6 shows a comparison of emission spectra for various doped zinc telluride materials, according to embodiments of the present invention.

The X-ray excited emission spectra of the microcolumnar ZnTe:O films were measured using a Cu target X-ray generator (8 keV Cu Kα line) available at RMD. To generate the required flux at the sample, the X-ray generator was operated at 40 kV with 20 mA current. The resulting scintillation light was passed through a McPherson model 234/302-0.2 m monochromator and measured. The intensity of the selected wavelength was registered using an RCA model C31034 photomultiplier tube (PMT). The operation of the whole instrument, including the X-ray trigger, the rotation of the monochromator to select the wavelengths, and the data acquisition and analysis, was software controlled. FIG. 6A shows the measured emission from a 400 micron thick ZnTe:O film showing a sharp peak at ~680 nm. The film spectrum resembles that of the commercial powdered ZnTe:O, indicating a close resemblance in their stoichiometry and scintillation mechanisms. FIG. 6B shows an emission spectrum of a film with higher dopant concentration resulting in a shift towards higher wavelength.

Figure 7:
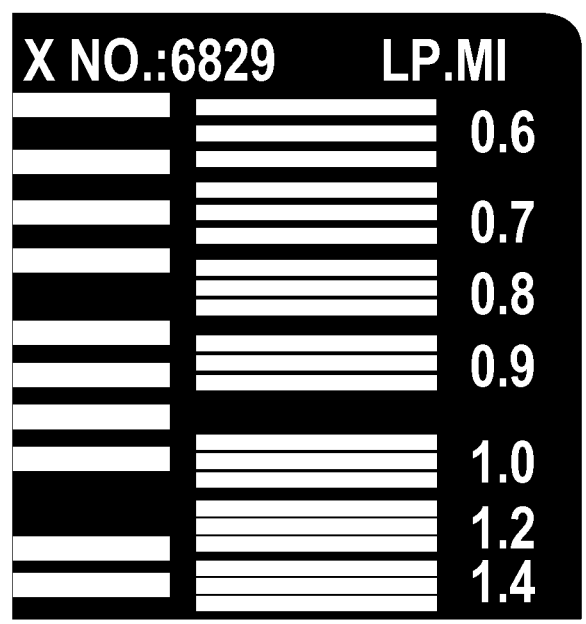
FIG. 7 shows a radiographic image acquired using a ZnTe:O scintillator, according to one embodiment of the present invention.

To illustrate the X-ray imaging capability of ZnTe:O, the ZnTe:O films were coupled to an in-house Photometrics XR-250 CCD, and images were acquired. This system consists of a 1024×1024 pixel CCD bonded to a 3:1 fiberoptic taper. The effective pixel size at the front (larger) end of the taper is 57 microns, resulting in a Nyquist limiting frequency of 8.6 lp/mm. A Gendex Corporation model GX 1000 X-ray generator, operated at 70 kVp, 15 mA settings (30 pulses per second) without any Lucite filtration was used to image the line-pair phantom. The X-ray source-to-detector distance was 45 cm, and the imaged object was placed in contact with the ZnTe:O film. As can be seen from X-ray image of the line-pair phantom shown in FIG. 7, the line-pair phantom was imaged with high contrast, and could resolve between 1.2 and 1.4 lp/mm using a 300 micron thick film deposited on a frosted quartz substrate. This illustrates the suitability of ZnTe:O films for high spatial resolution, high speed imaging applications.

Example 3

Fabrication of Columnar ZnTe:O Films Using Ball Milled ZnTe:O

This example describes the growth of 5 cm×5 cm area, up to a 1-mm-thick ZnTe:O film using a hot wall evaporation (HWE). One task in the growth of the columnar ZnTe:O films was to synthesize efficient ZnTe:O phosphor powder as a starting material for evaporation. However, high efficiency ZnTe:O powders are difficult to synthesize due to their high moisture sensitivity and chemical instability during synthesis. In the presence of moisture, ZnTe:O quickly decomposes to form precipitates of ZnO, Te, and $TeO_2$, which generate non-radiative defects in the lattice and quench the material's luminescence. In this example, ZnTe:O powder was successfully prepared by a dry synthesis process using gaseous doping and etching media. Specifically, 99.999% pure ZnTe in the form of crystals and powder, obtained from Alfa Aesar, Ward Hill, Mass., and Sigma Aldrich, St. Louis, Mo., respectively, were ball milled in an $O_2$ (air) atmosphere. Ball milling in air mechanically stimulated ion implantation of active oxygen ($O'$, $O_2'$, $O_x$, etc.) into the lattice due to the large local electric fields generated in the microcracks during crystal destruction. This resulted in high phase purity and oxygen doping with a high degree of crystal stoichiometry. The process also resulted in the formation of a tellurium oxide layer on the crystal surfaces, which significantly reduced the photoluminescence intensity of ZnTe. The removal of $TeO_2$ from the ZnTe:O surface was accomplished by annealing the material in a 95% $N_2$, 5% $H_2$ forming gas at 800 C for one hour. The resulting material was then used as a source for vapor deposition, which under favorable deposition conditions grows in the desired microcolumnar structured or polycrystalline non-structured layers. Although ZnTe:O powder is moisture sensitive, interestingly, the microcolumnar films of ZnTe:O exhibited no such effect. The films were stored in room atmosphere, but there was no noticeable degradation in performance even after several months.

Microcolumnar films of ZnTe:O were fabricated for high resolution, high efficiency X-ray imaging by evaporating commercially available, non-scintillating, low-cost ZnTe, ball-milled in air (to obtain the required oxygen). Vapor deposition of ZnTe:O films is a particularly difficult task, because it can be important not only to achieve a well-defined microcolumnar structure, but to do so with the appropriate associations and uniformity of concentrations of dopant species in the deposited material in order to produce the requisite scintillation properties. Furthermore, ZnTe sublimes rather than melts, thus making it important to dynamically adjust ZnTe:O source container temperatures to maintain evaporation (sublimation) rates. Finally, the relatively high temperatures in the range of 700° C. to 900° C. needed to achieve the desired film growth rate of 1 micron/min make it difficult to maintain the substrate temperature at the desired level(s), which may be needed for proper film structure. Successfully balancing these competing process parameters required significant hardware modifications to an existing thin film evaporation system. ZnTe:O films exhibited well-controlled columnar growth beginning at the substrate-film interface. The vapor deposition protocols provided herein stimulate well-separated columnar growth from the base of the film, which minimizes light scattering, thereby maintaining high spatial resolution and high collection efficiency.

Variations of the embodiments described herein may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context. The scope of the invention should, therefore, be determined not with reference to the above description, but instead should be determined with reference to the pending claims along with their full scope or equivalents.

What is claimed is:

1. A method of making a scintillator comprising zinc telluride and a dopant, the method comprising:
providing an evaporation apparatus comprising an evaporation chamber having a first end portion with a substrate positioned in a holder, and a second end portion with a first source boat separate from a second source boat, and one or more chamber walls at least partially disposed between the first and second end portions;
positioning a dopant salt in the first source boat and a zinc telluride (ZnTe) salt in the second source boat; and
vaporizing the dopant salt and the ZnTe within the evaporation chamber to deposit a scintillator film comprising zinc telluride and a dopant on a surface of the positioned substrate, wherein the film is deposited by a process comprising applying heat to the evaporation chamber so as to vaporize the dopant salt and the zinc telluride salt for film deposition while maintaining a temperature relationship of $T_{wall} > T_{source} > T_{substrate}$ for at least a portion of the deposition process.

2. The method of claim 1, wherein $T_{wall}$ comprises a temperature ranging between 700° C. and about 900° C.

3. The method of claim 1, wherein the dopant salt comprises O, Ag, Cu, Eu, Mn, Cl, Br or any combination thereof.

4. The method of claim 1, wherein the scintillator film is a polycrystalline microcolumnar, non-columnar polycrystalline, or non-columnar crystalline scintillator film.

5. The method of claim 1, wherein the scintillator film is microcolumnar.

6. The method of claim 1, wherein the scintillator is zinc telluride doped with oxygen (ZnTe:O).

7. The method of claim 6, wherein the scintillator comprises a uniform dopant concentration of oxygen.

8. The method of claim 1, wherein the substrate comprises a temperature between 350° C. to about 500° C. during deposition.

9. The method of claim 1, wherein the dopant salt is ZnO.

10. The method of claim 1, wherein the process further comprises annealing the deposited scintillator film.

11. A scintillator film comprising zinc telluride and a dopant, wherein the scintillator film is produced by a method as recited in claim 1.

12. A method of making a doped zinc telluride scintillator film, the method comprising:
providing a source material comprising zinc telluride;
providing a dopant;
evaporating, in a chamber, the source material with an electron beam; and
depositing, via vapor deposition within the chamber, the source material and the dopant on the surface of a substrate in the chamber, thereby forming a doped zinc telluride scintillator film, wherein the substrate is at a temperature between about 200° C. and about 500° C. during deposition.

13. The method of claim 12, wherein providing the dopant comprises evaporating a dopant source material with an electron beam such that the dopant source material is deposited below or on the deposited source material, and the method further comprises annealing the deposited source material and the dopant source material after deposition to form the doped zinc telluride scintillator film.

14. The method of claim 12, wherein providing the dopant comprises introducing a gas comprising the dopant to the chamber before or during deposition of the source material and the dopant, wherein the source material and the dopant are deposited together to form the doped zinc telluride scintillator film.

15. The method of claim 12, wherein the source material and the dopant are provided together in a doped ZnTe powder that is evaporated with the electron beam and deposited to form the doped zinc telluride scintillator film.

16. The method of claim 12, wherein the doped zinc telluride scintillator film is a microcolumnar film.

17. The method of claim 12, wherein the doped zinc telluride scintillator film is a polycrystalline film.

18. A doped zinc telluride scintillator film, wherein the scintillator film is produced by a method as recited in claim 12.

19. A method for making a scintillator film comprising zinc telluride and a dopant, the method comprising:
providing an evaporation apparatus comprising an evaporation chamber having a first end portion with a substrate positioned in a holder, and a second end portion with a source boat, and one or more chamber walls at least partially disposed between the first and second end portions;
positioning a doped zinc telluride material in the source boat;
depositing a scintillator material on a surface of the positioned substrate to form the doped zinc telluride scintillator,
wherein the film is deposited by a process comprising applying heat to the evaporation chamber so as to vaporize the doped zinc telluride material for film deposition while maintaining a temperature relationship of $T_{wall} > T_{source} > T_{substrate}$ for at least a portion of the deposition process, and $T_{wall}$ comprises a temperature ranging between 700° C. and about 900° C.

20. The method of claim 19, wherein the doped zinc telluride material comprises ball-milled ZnTe:O powder.

21. The method of claim 19, wherein the substrate comprises a temperature between 350° C. to about 500° C. during deposition.

22. The method of claim 20, wherein ball-milled ZnTe:O is annealed in a 95% $N_2$, 5% $H_2$ forming gas at about 800° C. before being positioned in the source boat.

23. A scintillator film comprising zinc telluride and a dopant, wherein the scintillator film is produced by a method as recited in claim 19.

24. A scintillator comprising a doped polycrystalline zinc telluride scintillator film.

25. The scintillator of claim 24, wherein the scintillator film is doped with a dopant comprising O, Ag, Cu, Eu, Mn, Cl, Br or any combination thereof.

26. The scintillator of claim 24, wherein the scintillator film is microcolumnar.

27. The scintillator of claim 24, wherein the scintillator film is non-columnar.

28. A radiation detection device comprising a scintillator of claim 24; and a photodetector assembly optically coupled to the scintillator.

29. The radiation detection device of claim 28, further comprising electronics coupled to the photodetector assembly so as to output image data in response to radiation detected by the scintillator.

30. The radiation detection device of claim 28, wherein the device comprises a Cs:I scintillator material and is configured for dual energy imaging.

31. A method of performing radiation detection, comprising:
providing a detector device comprising a scintillator of claim 24; and a photodetector assembly optically coupled to the scintillator; and
positioning a radiation source within a field of view of the scintillator so as to detect emissions from the radiation source.

32. A method of making a scintillator comprising zinc telluride and a dopant, the method comprising:
providing an evaporation apparatus comprising an evaporation chamber having a first end portion with a substrate positioned in a holder, and a second end portion with a first source boat separate from a second source boat, and one or more chamber walls at least partially disposed between the first and second end portions;
positioning a dopant salt in the first source boat and a zinc telluride (ZnTe) salt in the second source boat; and
vaporizing the dopant salt and the ZnTe within the evaporation chamber to deposit a scintillator film comprising zinc telluride and a dopant on a surface of the positioned substrate, wherein the substrate comprises a temperature between 350° C. to about 500° C. during deposition.

33. A method of making a doped zinc telluride scintillator film, the method comprising:
providing a source material comprising zinc telluride;
evaporating, in a chamber, the source material with an electron beam;
providing a dopant source material;
evaporating the dopant source material with an electron beam;
depositing, via vapor deposition within the chamber, the source material and the dopant source material on the surface of a substrate in the chamber such that the dopant source material is deposited below or on the deposited source material; and
annealing the deposited source material and the dopant source material after deposition to form the doped zinc telluride scintillator film.

34. A method of making a doped zinc telluride scintillator film, the method comprising:
providing a source material comprising zinc telluride;
evaporating, in a chamber, the source material with an electron beam;
depositing, via vapor deposition within a chamber, the source material on the surface of a substrate in the chamber;
introducing a gas comprising a dopant to the chamber before or during deposition of the source material so that the source material and the dopant are deposited together to form the doped zinc telluride scintillator film.

35. A method of making a doped zinc telluride scintillator film, the method comprising:
providing a source material comprising zinc telluride;
providing a dopant;
evaporating, in a chamber, the source material with an electron beam; and
depositing, via vapor deposition within the chamber, the source material and the dopant on the surface of a substrate in the chamber, thereby forming a doped zinc telluride scintillator film, wherein the source material and the dopant are provided together in a doped ZnTe powder that is evaporated with the electron beam and deposited to form the doped zinc telluride scintillator film.

36. A method of making a doped zinc telluride scintillator film, the method comprising:
providing a source material comprising zinc telluride;
providing a dopant;
evaporating, in a chamber, the source material with an electron beam; and
depositing, via vapor deposition within the chamber, the source material and the dopant on the surface of a substrate in the chamber, thereby forming a microcolumnar doped zinc telluride scintillator film, wherein the substrate is at a temperature of less than about 100° C. during deposition.

* * * * *